United States Patent [19]
Hori

[11] Patent Number: 5,533,057
[45] Date of Patent: Jul. 2, 1996

[54] HIGH FREQUENCY SIGNAL DETECTING CIRCUIT

[75] Inventor: Tsuguo Hori, Tokyo, Japan

[73] Assignee: NEC Corporation, Japan

[21] Appl. No.: 158,701

[22] Filed: Nov. 29, 1993

[30] Foreign Application Priority Data

Nov. 27, 1992 [JP] Japan .................................. 4-318716

[51] Int. Cl.[6] .......................... H04L 27/04; H04L 25/03; H04J 3/16
[52] U.S. Cl. .......................... 375/295; 375/296; 370/95.3
[58] Field of Search ................................ 375/75, 59, 60, 375/58, 295, 285, 296, 297; 370/95.3

[56] References Cited

U.S. PATENT DOCUMENTS

| 4,356,567 | 10/1982 | Eguchi et al. .......................... 455/122 |
| 4,495,619 | 1/1985 | Acampora .................................. 375/58 |

FOREIGN PATENT DOCUMENTS

| 4211549 | 10/1992 | Germany . |
| 2140235 | 10/1982 | United Kingdom . |

*Primary Examiner*—Stephen Chin
*Assistant Examiner*—Tesfaldet Bocure
*Attorney, Agent, or Firm*—Ostrolenk, Faber, Gerb & Soffen

[57] ABSTRACT

A high frequency signal detecting circuit capable of smoothing a mean power in each time slot and performing rapid response during transition time. A detector detects the envelope of a radio frequency signal whose power level may change depending on the time slot. In response to a control signal, a filter narrows the pass band in the data field of each time slot and broadens it in the transition field of the same. The output of the detector is applied to the filter. The detecting circuit, therefore, produces an output which is smoothed in the data field without regard to the content of data and which responds to a change in the power level sharply in the transition field.

4 Claims, 6 Drawing Sheets

HIGH FREQUENCY SIGNAL DETECTING CIRCUIT

BACKGROUND OF THE INVENTION

The present invention relates to a detecting circuit for detecting a high frequency or radio frequency (RF) signal and, more particularly, to a detecting circuit of the type required to have a linear detection characteristic, as one used to control transmission power in a TDMA (Time Division Multiple Access) communication system.

A detecting circuit of the type described has to meet the following two requisites at the same time when used to detect a TDMA signal or similar RF signal whose power level may change from one time slot to another. One requisite is that the mean detection output level of the circuit be maintained smooth in data fields. The other requisite is that a transition time existing between nearby time slots be confined in a range which does not effect the mean detection output level. However, a detecting circuit meeting both of these requirements has not been reported yet.

SUMMARY OF THE INVENTION

It is, therefore, an object of the present invention to provide a detecting circuit capable of smoothing mean power in each time slot and, at the same time, performing rapid response during each transition time.

A detecting circuit of the present invention comprises a detector for detecting the envelope of a high frequency signal whose mean power level may change depending on the time slot, and a low-pass filter responsive to a control signal for broadening the pass band for the output of the detector only during the transition time of the mean power level of the high frequency signal.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 2:
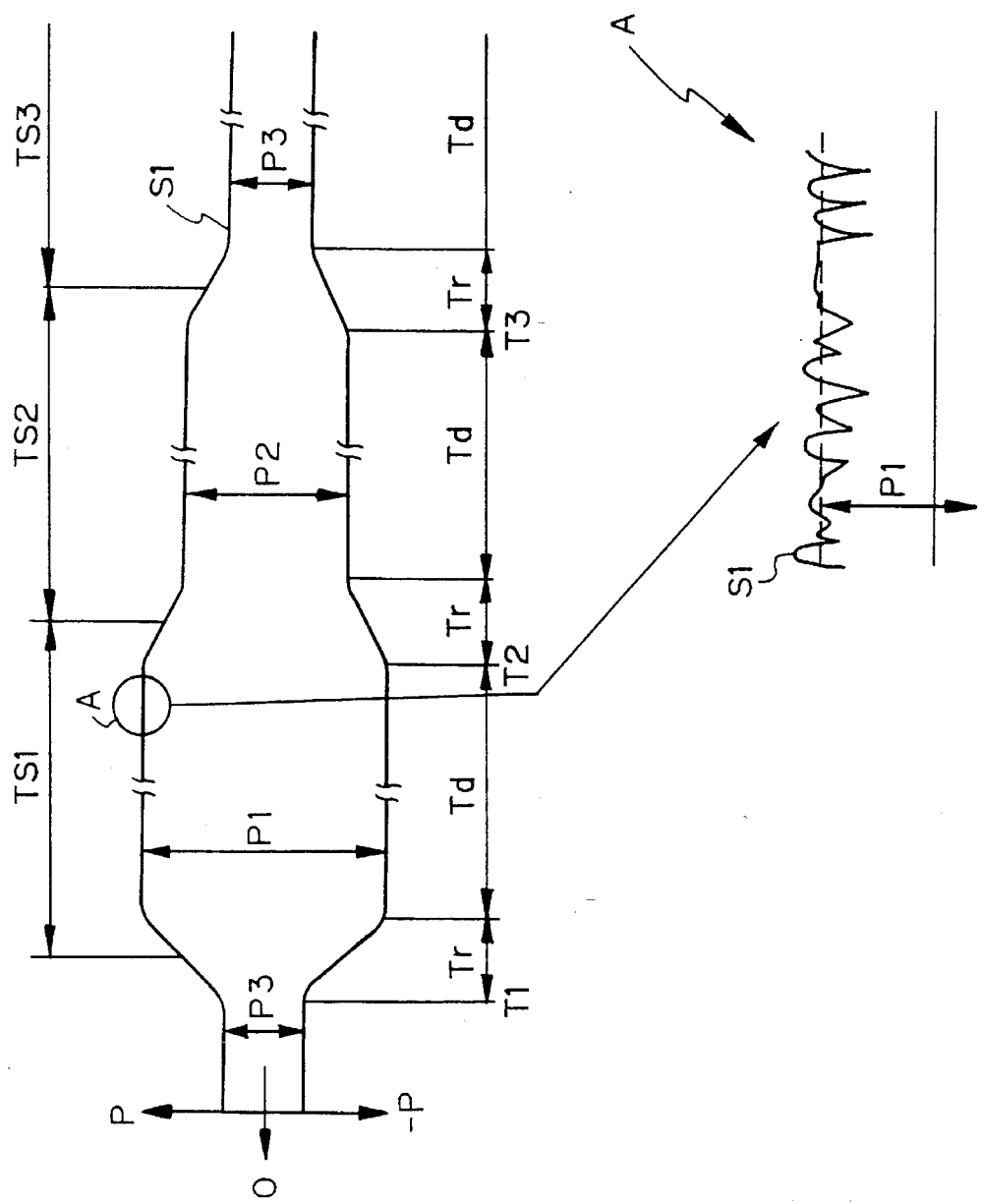
FIG. 2 shows the levels of power input to a detector included in the embodiment.

To better understand the present invention, a brief reference will be made to a conventional high frequency detecting circuit, shown in FIG. 6. As shown, the detecting circuit includes a detector 3 connected to an amplifier 1. The amplifier 1 is provided at the final stage of, for example, a transmitter included in a digital mobile telephone system. The amplifier 1 delivers a TDMA signal S1 to an output terminal 2. The TDMA signal S1 is an example of transmission signals particular to digital mobile telephones now under development in Japan, as taught in the Journal of the Institute of Electronic Data Communication Engineers of Japan, Vol. 73, No. 8, Aug. 1990. Specifically, in the TDMA signal 1, three channels are accommodated in a single carrier lying in the 800 MHz band or 1.5 GHz band, and a single frame is made up of three time slots TS1–TS3 and repeated at a period of 20 mS; each time slot TS has a duration of 6.7 mS. The TDMA signal 1 has a data field Td in each time slot TS and has, between nearby time slots TS, a transition time or field Tr beginning at the end of the data field Td of the preceding time slot TS (standardized duration being about 90 μS). The transition time Tr includes a guard time. The power level of the TDMA signal 1 differs from one destination to another, i.e., from one time slot TS to another in respect of a mean value P; the data fields Td of the time slots TS1, TS2 and TS3 have mean values P1, P2 and P3, respectively. Further, even in the same data field Td, the instantaneous value changes with the content of data (see FIG. 2, portion A).

Figure 3:
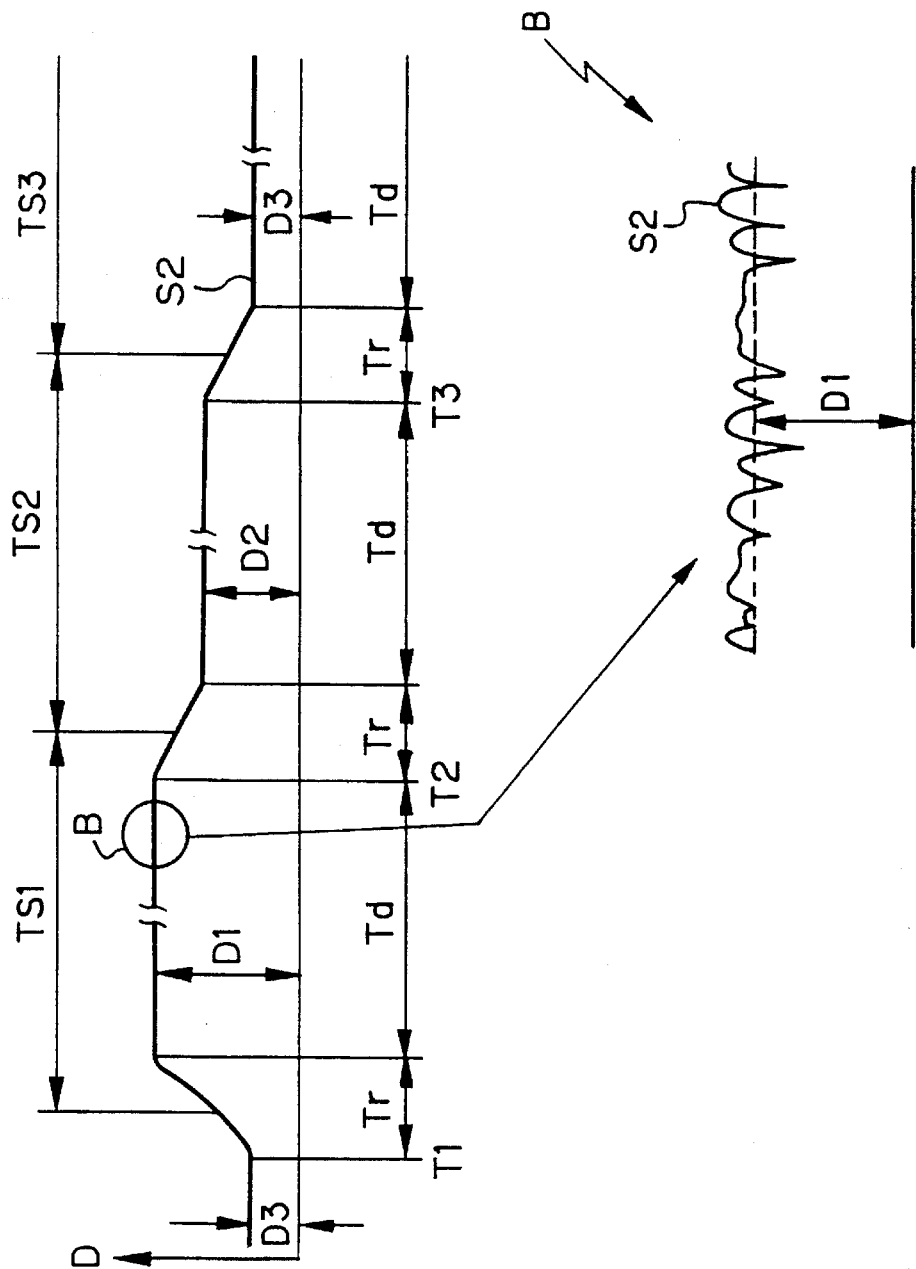
FIG. 3 shows the levels of the output of the detector.
Figure 6:
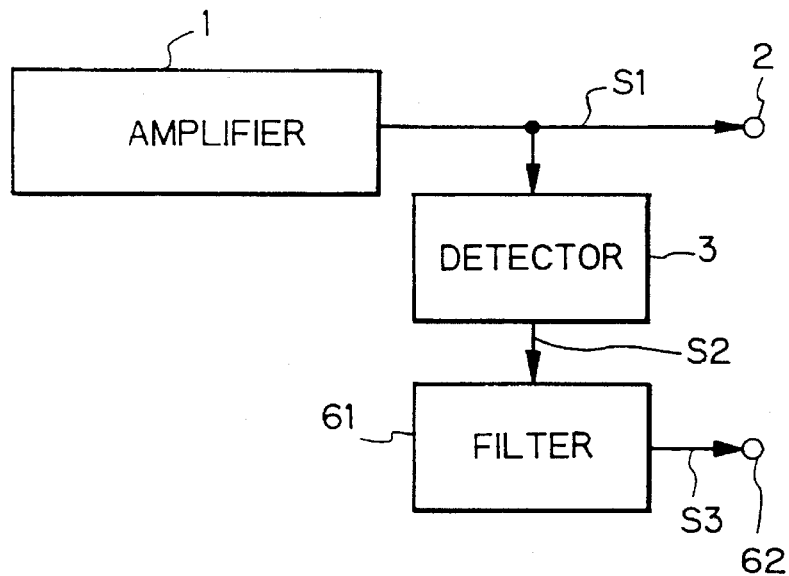
FIG. 6 is a schematic block diagram of a conventional detecting circuit.

The detector 3 shown in FIG. 6 detects the envelope of the TDMA signal 1 and produces an output S2. FIG. 3 shows the levels of the detector output S2. Since the detector 3 lacks the function of limiting the frequency band of the input signal, the time response of the detector output S2 corresponds to the TDMA signal S1. In addition, the above-mentioned mean power P and the detector output level D are proportional to each other.

The prerequisite with a digital mobile telephone system is that the mean value P of the power level of the TDMA signal S1 be controlled on a time slot TS basis. To meet this prerequisite, the power level of each data field Td has to be prevented from changing with the content of data. For this purpose, a filter 61, FIG. 6, is connected to the output of the detector 3. Specifically, the filter 61 limits the frequency band of the detector output S2 to thereby smooth the detector output level D in each data field Td. The resulting output S3 of the filter 61 is delivered to an output terminal 62 as a detection output. The filter 61 is implemented as an active filter.

Figure 7:
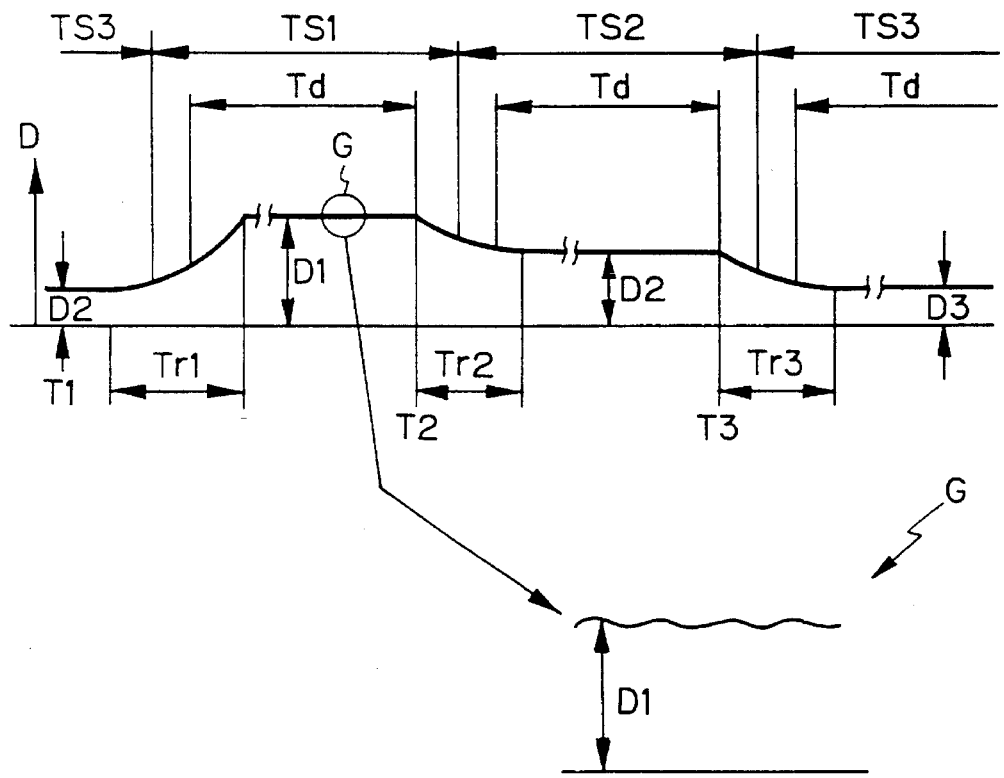
FIG. 7 shows the output of the circuit shown in FIG. 6.

The detection output S3 eliminates the changes in the detector output level D ascribable to changes in data. However, the signal S3 increases the transition time Tr to the next time slot TS. Specifically, as shown in FIG. 7, the levels D1 and D2 of the detector output S2 in the time slots TS1 and TS2 are different from each other. As a result, the transition from the level D1 to the level D2 needs a transition time Tr2 longer than the transition time Tr. Moreover, the transition times Tr1, Tr2 and Tr3 associated with the time slots TS1, TS2 and TS3 are different from each other. Since the transition times Tr1–Tr3 each extends into the associated data field Td, the mean level D of the detection output S3 is effected, in the data field Td where the detector output level D should remain constant, by the detector output level of the preceding time slot TS. This requires, for example, the data at the detector output level D to be discarded in part of the data field Td. In this manner, the conventional detecting circuit suffers from various limitations in producing an accurate output S3 in each time slot TS.

More specifically, the filter 61 smooths the data fields Td of the detector output S2 and, therefore, does not change the cut-off frequency. In this condition, if a low cut-off frequency is selected, the time constant of the filter 61 will increase and cause the period of time necessary for the transition time Tr to be processed to increase. This causes the transition time Tr to extend into the data field Td of the detector output S2, thereby reducing the period of time available for sampling the data field Td. Consequently, the number of data to be sampled in the data field Td is reduced, forcing a part of the data field Td to be discarded.

As stated above, in the event of detecting a TDMA signal or similar RF signal whose power level may change from one time slot to another, the conventional detecting circuit cannot confine the transition time between nearby time slots in a range which does not effect the mean output level, while maintaining the output level smooth in the data field.

Figure 1:
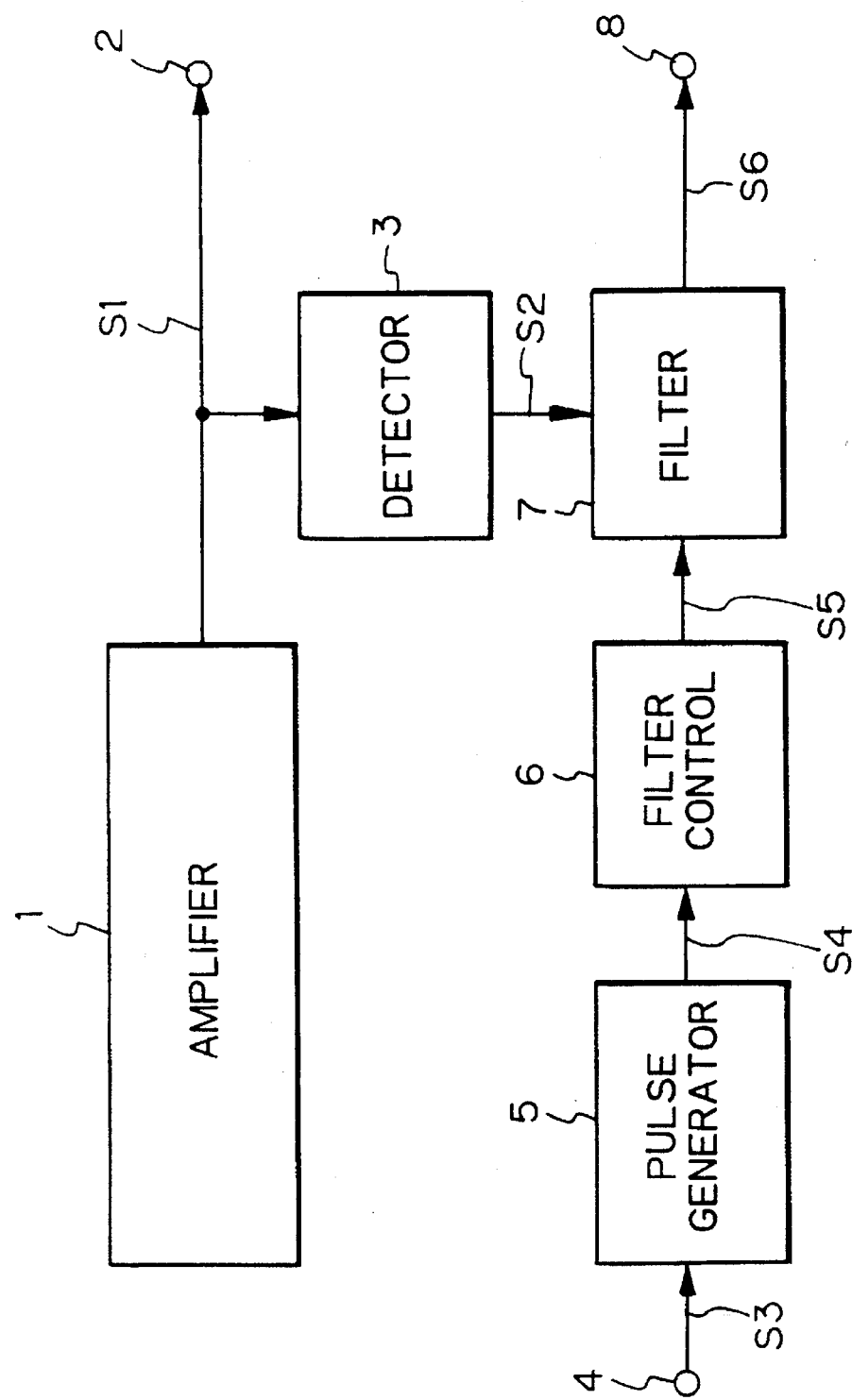
FIG. 1 is a block diagram schematically showing a detecting circuit embodying the present invention.
Figure 4:
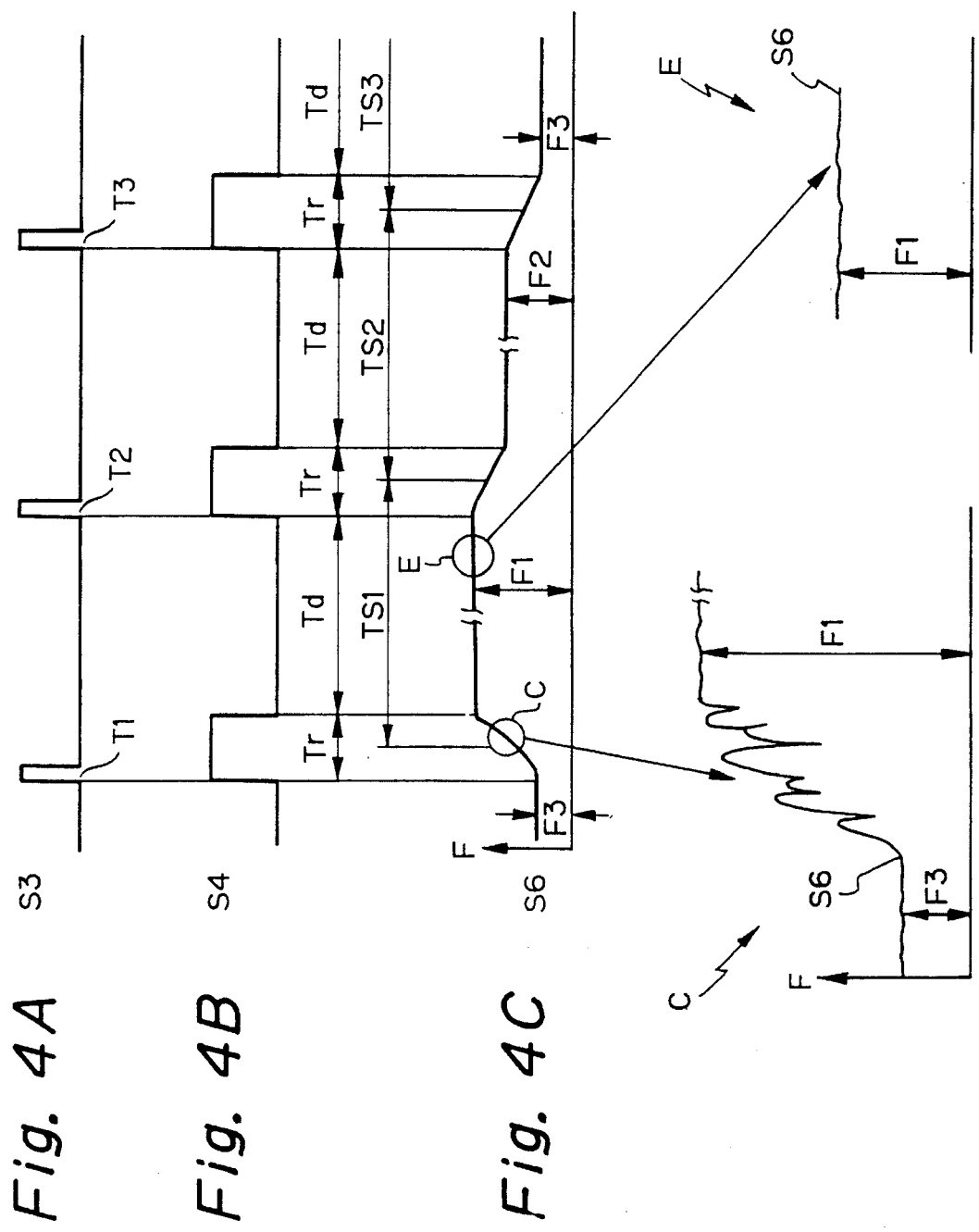
FIGS. 4A–4C show the waveforms of signals appearing in the embodiment.

Referring to FIG. 1, a detecting circuit embodying the present invention is shown. As shown, the detecting circuit has a control signal input terminal 4, a pulse generator 5, a filter control 6, a filter 7, and an output terminal 8, in addition to the conventional amplifier 1, detector 3, and output terminal 2. As shown in FIG. 4A, a control signal S3 has a pulse width of 20 μS and a period of time slots TS. The control signal S3 comes in through the input terminal 4 at times T1, T2 and T3 in synchronism with the beginnings of consecutive transition times Tr. The pulse generator 5 generates a pulse signal S4, FIG. 4B, having the same duration (pulse width of 90 μS) as the transition time Tr every time the control signal S3 arrives. The pulse signal S4 is applied to the filter control 6.

The filter 7 is implemented as a low-pass filter for limiting the frequency band of the output S2 of the detector 3. Specifically, the filter 7 changes the pass band of the detector output S2, i.e., the cut-off frequency fc under the control of the filter control 6. More specifically, when the pulse signal S4 is in a high level (transition time Tr), the filter 7 forms a broad pass band, i.e., raises the cut-off frequency. As a result, a detection output with rapid response, as shown in FIG. 4C, is fed to the output terminal 8. On the other hand, when the pulse signal S4 is in a low level (data field Td), the filter 7 forms a narrow pass band, i.e., lowers the cut-off frequency. Consequently, a detection output S6, FIG. 4C, having a smoothed response is fed out via the output terminal 8. In this manner, in each data field Td of the TDMA signal S1, the detection output S6 has the level F thereof smoothed and maintained constant without regard to the content of data. At the same time, in each transition field Tr, the output level F follows a change in the power level of the TDMA signal S1 immediately since the filter 7 responds at high speed.

Figure 5:
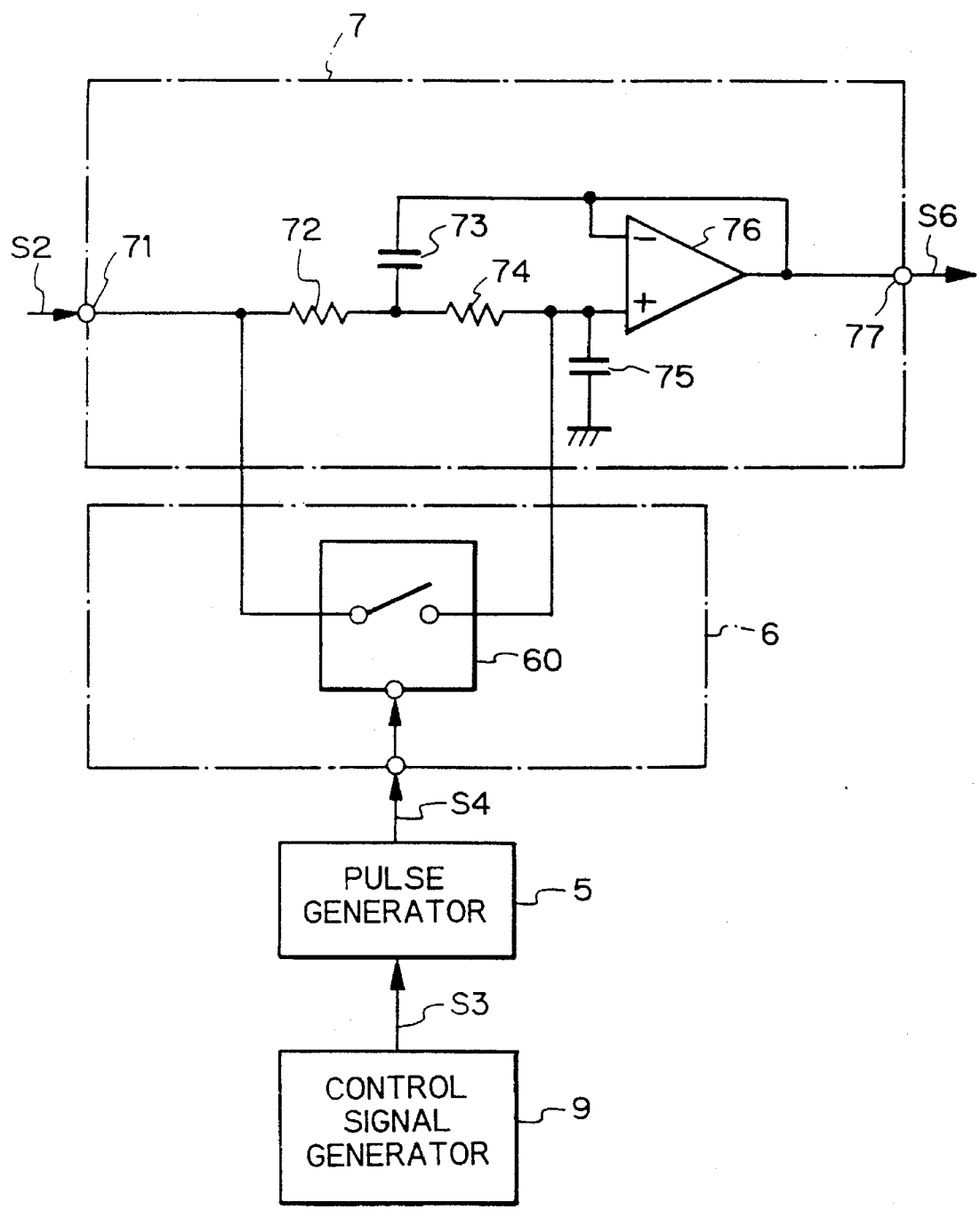
FIG. 5 is a circuit diagram showing specific constructions of a filter and a filter control included in the embodiment.

Specific circuitry including the filter 7 and filter control 6 is shown in FIG. 5. The filter 7 is an active filter. As shown, the output S2 of the detector 3 is applied to an input terminal 71 included in the filter 7. The signal S2 is routed through resistors 72 and 74 having the same resistance R to the non-inverting input of an operational amplifier 76. The operational amplifier 76 has the non-inverting input thereof connected to ground via a capacitor 75 whose capacitance is C2. The output terminal of the amplifier 76 is connected to an output terminal 77 on which the detection output S6 appears. The detection output S6 is fed back to the inverting input of the amplifier 76 directly and via a capacitor 73 having a capacitance C1 and the resistor 74. The cut-off frequency fc of the filter 7 is expressed as:

$$fc = \frac{1}{2}^{1/2} \cdot \pi C1 \cdot R$$

The filter control 6 is implemented by a switch 60 which is turned on and turned off by the pulse signal S4 applied thereto from the pulse generator 5. The switch 60 may be implemented by an IC (Integrated Circuit), e.g., μPD4538 available from NEC Corporation. When the pulse signal S4 is in a high level, the switch 60 short-circuits the resistors 72 and 73 of the filter 7. Specifically, since the resistors 72 and 74 are not connected, the time constant of the filter 7 decreases. The capacitor 73 discharges when the data field Td changes from a high level to a low level or charges when the data field Td changes from a low level to a high level. This is successful in reducing the transmission time Tr to less than 90 μS and, therefore, in guaranteeing a sufficient sampling time. On the other hand, when the pulse signal S4 is in a low level, the switch 60 does not short-circuit the resistors 72 and 73 of the filter 7. At this time, the conventional smoothing operation is effected, and the filter 7 restores the great time constant. As a result, when the pulse signal S4 is in a low level, the filter 7 produces a detection output S6 having the cut-off frequency represented by the above equation and frequency components of 0 to fc. Since one time slot is 6.7 mS long and the transition time Tr is 90 μS, the cut-off frequency fc should preferably be about 3 kHz. On the other hand, when the pulse signal S4 is in a high level, the cut-off frequency of the filter 7 is determined by the cut-off frequency fca of the operational amplifier 76 since the resistors 74 and 75 are short-circuited. Considering the transition time Tr which is 90 μS, the cut-off frequency fca will respond to the transition time Tr sufficiently if it is higher than 30 kHz.

It is to be noted that the control signal S3 applied to the pulse generator 5 is generated by a control signal generator 9, FIG. 5, in synchronism with a host station.

In summary, in accordance with the present invention, a detecting circuit has a detector for detecting the envelope of an RF signal whose power level may change depending on the time slot, and a filter for narrowing the pass band in the data field of each time slot and broadening it in the transition field of the same. The output of the detector is applied to the filter. The detecting circuit, therefore, produces an output which is smoothed in the data field without regard to the content of data and which responds to a change in the power level sharply in the transition field.

Various modifications will become possible for those skilled in the art after receiving the teachings of the present disclosure without departing from the scope thereof.

What is claimed is:

1. A detecting circuit comprising:

means for generating a high frequency signal having an envelope whose mean power level may change depending on a time slot;

detecting means for detecting the envelope of the high frequency signal;

means for generating a control signal; and low-pass filtering means responsive to the control signal for broadening a pass band for an output of said detecting means only during a transition time of the mean power level of the high frequency signal.

2. A detecting circuit as claimed in claim 1, wherein said low-pass filtering means comprises:

a pulse generator responsive to said control signal for generating a pulse signal identical in width as the transition time; and a low-pass filter responsive to said pulse signal for broadening said pass band for said output only when said pulse signal is in a high level.

3. A detecting circuit as claimed in claim 1, wherein the high frequency signal comprises a TDMA signal having a data period repeating with the intermediary of the transition time, said low-pass filtering means comprising a low-pass filter for raising a cut-off frequency only during said transition time of said TDMA signal in response to said control signal.

4. A detecting circuit as claimed in claim 3, wherein said low-pass filter comprises an active filter.

* * * * *